April 21, 1970     J. R. BENFORD     3,507,554
5X MAGNIFICATION SEMI-OBJECTIVE WITH FIELD FLATTENING LENS
Filed May 10, 1967
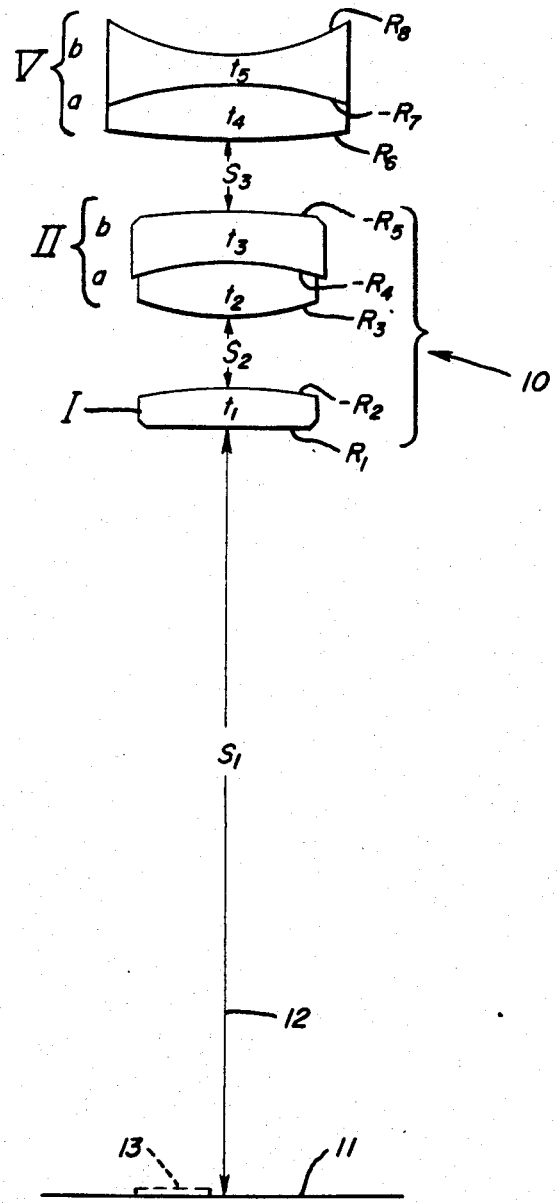
TOTAL MAGNIFICATION = 5.0 X
N.A. = .08
JAMES R. BENFORD
INVENTOR.
BY Frank C. Parker
ATTORNEY United States Patent Office 3,507,554
Patented Apr. 21, 1970

3,507,554
5× MAGNIFICATION SEMI-OBJECTIVE WITH FIELD FLATTENING LENS
James R. Benford, Irondequoit, N.Y., assignor to Bausch & Lomb Incorporated, Rochester, N.Y., a corporation of New York
Filed May 10, 1967, Ser. No. 637,477
Int. Cl. G02b 9/12, 21/02
U.S. Cl. 350—177                           2 Claims

ABSTRACT OF THE DISCLOSURE

A microscope semi-objective having substantially unity magnification per se which is designed for use with an associated negative field flattening lens having substantially 5.0× magnification so as to produce cooperatively a total magnification of substantially 5.0× and a numerical aperture of .08, said semi-objective being one of a set of such semi-objectives of different powers which are used interchangeably with the field flattening lens.

BACKGROUND OF INVENTION

A semi-objective of the kind described herebelow is intended for use in cooperative association with a plurality or set of other related semi-objectives in a microscope rotatable nosepiece, the individual semi-objectives having different respective magnifications covering a large range of image magnification, each such semi-objective being corrected aberrationwise together with a single stationary negative corrector lens to produce the best practical overall correction of the imaging aberrations.

Such a semi-objective is not known, in the prior art and the closest art, as far as the form of the semi-objective is concerned, is the patent to J. H. Small, 2,520,019, issued Aug. 22, 1950, showing a low power microscope objective composed of two widely spaced doublet lenses. However, no auxiliary aberration correcting lens is called for in the patent so that Small's micro-objective is independently corrected per se.

SUMMARY OF THE INVENTION

The present invention relates to microscope optical systems and more particularly relates to improvements in the objective lens system thereof.

It is an object of the present invention to provide a novel objective lens system having a substantially 5× magnification and .08 numerical aperture for a microscope, said system being formed cooperatively by a semi-objective having substantially unity magnification and a negative field flattening and aberration correcting lens having substantially 5× magnification.

It is a further object to provide such a microscope objective lens system which cooperatively produces an excellent flat field and substantially corrects the chromatic and monochromatic image aberrations including secondary spectrum, Petzval condition, coma, lateral color and astigmatism, the construction thereof being comparatively economical and low cost compared to micro-objectives of comparable performance.

Further objects and advantages will be apparent in the arrangement and construction of the constituent parts in detail as set forth in the following specification taken together with the accompanying drawing.

DESCRIPTION OF THE DRAWING

The single figure of the drawing is an optical diagram showing a preferred form of the present invention.

DESCRIPTION OF PREFERRED EMBODIMENT

In the preferred embodiment of the present invention, there is provided a semi-objective which is generally designated by numeral 10 and it comprises a front positive singlet lens member which is designated I, the form being generally plano convex with the plano surface toward the specimen or object surface 11. Lens member I is spaced from the object surface 11 at a distance $S_1$ along the optical axis 12 and has an axial thickness designated by $t_1$. A cover glass .18 mm., thick is denoted by numeral 13.

Rearwardly of front lens I in opical alignment therewith is spaced a positive doublet lens member designated II at an axial distance $S_2$, said lens member II comprising a front double convex lens element designated IIa and a rear negative meniscus lens element designated IIb lying in full surface contact with lens IIa. The respective axial thicknesses of lens elements IIa and IIb are designated $t_2$ and $t_3$, and the latter element is separated from the aforesaid negative corrector lens V by an axial distance which is designated $S_3$.

The outstanding characteristic of the present invention relates to the provision of the aforesaid field flattening and correcting lens V, the purpose thereof being described hereinafter. Preferably the correcting lens member V is constructed as a meniscus lens which is concave toward the rear or image side of the lens system 10. Member V is composed of a front double convex lens element designated Va lying in surface contact with a rear double concave lens element designated Vb, the respective constructional parameters of the front and rear elements being chosen as specified hereinafter to improve the flatness of field as well as to reduce the aberrations.

As heretofore indicated, the optical equipment of the variable power microscope, wherein the semi-objective is used, includes a *plurality* of semi-objectives of different powers or magnifications, all of which are mounted in a single rotatable nosepiece so that individually each one may be optically aligned with the aforesaid stationary negative field flattening lens member V. Each semi-objective is parfocalized with respect to all the other semi-objectives. It is important that each one be optically designed in detail with careful regard for the total or final aberration correcting properties to be obtained when combined with the negative lens member V.

With particular reference to the complete optical system, the improvements and advantages desired are listed herebelow.

(1) The secondary spectrum of the image produced by the semi-objective 10 together with the negative corrector lens V is improved.

(2) The Petzval condition of the final image is improved due to the balancing contribution of the negative focal length of the corrector lens and the positive focal length of the 1× semi-objective, resulting in an extremely flat field.

(3) Coma condition of the image is improved.

(4) The lateral color aberration is matched to that of the aforementioned other semi-objectives, so that a single eyepiece type will work with all powers of objectives.

(5) Astigmatism is reduced to essentially zero.

(6) A further benefit obtained by a microscope optical system which uses a field flattening lens member V is that the individual lens elements of the semi-objective 10 itself may be simplified and the curvatures of the refractive surfaces may be flattened which reduces the cost of manufacture. All of these advantages are gained without impairment of a favorable value for the numerical aperture of the optical system.

As mentioned heretofore, the semi-objective 10 works at substantially unity magnification and the field flattening lens V contributes 5× magnification so that the total magnification of this combination is substantially 5×.

According to the present invention, the values for the constructional parameters or data which describe the objective lens system including the corrector lens V are arrived at by careful calculation and experiment and these values are set forth in Table I herebelow wherein $F(I)$, $F(II)$, $F(IIa)$, $-F(IIb)$, $F(Va)$ and $F(Vb)$ respectively and the minus (—) sign means negative focal length, the airspaces $S_1$ to $S_3$ and lens axial thicknesses $t_1$ to $t_3$ being defined hereabove, said values being stated in ranges in terms of F which represents the equivalent focal length of the semi-objective 10 combined with corrector lens V.

TABLE I $1.48F < F(I) < 1.58F$
$1.48F < F(II) < 1.58F$
$.55F < F(IIa) < .60F$
$.84F < -F(IIb) < .90F$
$1.31F < -F(V) < 1.40F$
$.73F < F(Va) < .78F$
$.44F < -F(Vb) < .48F$
$.069F < t_1 < .078F$
$.095F < t_2 < .100F$
$.098F < t_3 < .111F$
$.098F < t_4 < .107F$
$.057F < t_5 < .066F$
$1.43F < S_1 < 1.51F$
$.11F < S_2 < .15F$
$.09F < S_3 < .18F$

The values in Table I are given in ranges of values which include a median, nominal or ideal value for each parameter stated, said parameters being so stated for practical manufacturing and commercial reasons mentioned herebelow. It is well known in the lens making art that it is practically impossible to manufacture a production run of lens elements economically while maintaining all of the lens parameters at specific nominal or ideal values. Therefore, the lens designer specifies small tolerances or ranges of values for each parameter within which the lens elements may be manufactured economically and relatively quickly while maintaining acceptable optical quality and this practice when applied to all of the lens parameters permits an objective 10 to be assembled which is capable of good optical performance in all cases. This is due to a common assembly technique.

The technique used by the manufacturer is to separate out and classify the lens elements which fall within said ranges of values and then selectively assembly from these elements a complete objective lens system, said lens elements being chosen to compensate each other aberrationwise as far as possible. Such a technique is highly successful in producing, at least cost, a good semi-objective as far as good optical requirements are concerned.

In Table II herebelow are given the ranges of values, in terms of F, for the radii of the successive lens surfaces which are designated $R_1$ to $-R_5$ for the lens elements I to $Vb$ inclusively, the minus (—) sign used with certain of these values meaning that such a surface is concave toward the entrant rays. Also in Table II are given the ranges of absolute values for the refractive indices $n_D(I)$, $n_D(IIa)$, $n_D(IIb)$, $n_D(Va)$ and $n_D(Vb)$ and Abbe numbers $\nu(I)$, $\nu(IIa)$, $\nu(IIb)$, $\nu(Va)$ and $\nu(Vb)$ related to said elements.

TABLE II $R_1 > \pm 5.0F$
$.80F < -R_2 < .81F$
$.53F < R_3 < .54F$
$.61F < -R_4 < .62F$
$10.83F < -R_5 < 10.85F$
$1.65F < R_6 < 1.67F$
$.83F < -R_7 < .85F$
$.43F < R_8 < .45F$
$1.527 < n_D(I) < 1.530$
$1.513 < n_D(IIa) < 1.515$
$1.749 < n_D(IIb) < 1.753$
$1.749 < n_D(Va) < 1.753$
$1.612 < n_D(Vb) < 1.614$
$51.0 < \nu(I) < 52.2$
$69.5 < \nu(IIa) < 71.0$
$26.5 < \nu(IIb) < 29.0$
$26.5 < \nu(Va) < 29.0$
$43.0 < \nu(Vb) < 45.5$

More specifically, the values of all of the above mentioned constructional parameters for one typical successful semi-objective 10 and its corrector lens V are given substantially, in terms of F, in both Table III and Table IV herebelow except for the values of refractive index $n_D$ and Abbe number $\nu$ which are given in absolute values.

TABLE III $F(I) = 1.527F$
$F(II) = 1.529F$
$F(IIa) = 0.574F$
$-F(IIb) = 0.868F$
$F(Va) = .757F$
$-F(Va) = 1.357F$
$-F(Vb) = .458F$
$t_1 = 0.073F$
$t_2 = 0.098F$
$t_3 = 0.105F$
$t_4 = .102F$
$t_5 = .061F$
$S_1 = 1.470F$
$S_2 = 0.131F$
$S_3 = 0.132F$
$n_D(I) = 1.5286$
$n_D(IIa) = 1.5140$
$n_D(IIb) = 1.7506$
$n_D(Va) = 1.7506$
$n_D(Vb) = 1.613$
$\nu(I) = 51.6$
$\nu(IIa) = 70.2$
$\nu(IIb) = 27.8$
$\nu(Va) = 27.8$
$\nu(Vb) = 44.2$

TABLE IV $R_1 = $ PLANO
$-R_2 = .807F$
$R_3 = .538F$
$-R_4 = .612F$
$-R_5 = 10.838F$
$R_6 = 1.663F$
$-R_7 = .841F$
$R_8 = .433F$ $n_D(I) = 1.5286$
$n_D(IIa) = 1.5140$
$n_D(IIb) = 1.7506$
$n_D(Va) = 1.7506$
$n_D(Vb) = 1.613$ $t_1 = .073F$
$t_2 = .098F$
$t_3 = .105F$
$t_4 = .102F$
$t_5 = .061F$
$S_1 = 1.470F$
$S_2 = .131F$
$S_3 = .132F$

Absolute values
$\nu(I) = 51.6$
$\nu(IIa) = 70.2$
$\nu(IIb) = 27.8$
$\nu(Va) = 27.8$
$\nu(Vb) = 44.2$ It will be seen from the foregoing disclosure that a semi-objective is provided having an improved flatness of field and aberration condition when combined with the field flattening lens V in satisfaction of the stated objects of the present invention. Although only a single form of the invention has been shown and described in detail, other forms are possible and changes may be made in the form and detailed structure of the lens parts thereof without departing from the spirit of the invention.

I claim:

1. A microscope semi-objective which is used in cooperation with a negative field flattening and aberration correcting lens having 5× magnification per se, said negative lens being interchangeably used with a set of other semi-objectives of different powers which are all parfocalized with respect to each other, said field flattening lens and semi-objective being designed to be complementary to each other in producing a total image magnification of 5× and a numerical aperture of .08 whereby the present semi-objective per se produces a magnification of substantially 1.0× and the equivalent focal length of said field flattening lens being designated $-F(V)$, said semi-objective and field flattening lens comprising a front positive singlet lens designated I which is spaced from a specimen plane at an axial distance designated $S_1$ and has an axial thickness designated $t_1$, a positive doublet lens designated II spaced rearwardly of lens I at an axial distance designated $S_2$, lens II being composed of a front double convex lens element designated IIa which lies in full surface contact with a rear negative meniscus lens element designated IIb, the distance between element IIb and said rearwardly located field flattening lens V being designated $S_3$, said field flattening lens comprising a front double convex lens element Va which lies in surface contact with a rear double concave lens element Vb, the lens members I, II and V, and lens elements IIa, IIb, Va and Vb having equivalent focal lengths which are designated respectively $F(I)$, $F(II)$, $-F(V)$, $F(IIa)$, $-F(IIb)$, $F(Va)$ and $-F(Vb)$, the specific values for the constructional parameters for one successful form of said semi-objective including the aforementioned focal lengths $F(I)$ to $-F(V)$ as well as the aforementioned airspaces $S_1$ to $S_3$, lens thicknesses $t_1$ to $t_5$, and refractive indices $n_D$ and Abbe numbers $\nu$ of the respective lens elements I to IIb and Va and Vb being given in the table hereinbelow in terms of F which represents the combined focal length of the lenses I, II and V, the minus ($-$) sign meaning that the focal length of that lens is negative $F(I) = 1.527F$
$F(II) = 1.529F$
$F(IIa) = .574F$
$-F(IIb) = .868F$
$-F(V) = 1.357F$
$F(Va) = .757F$
$-F(Vb) = .458F$
$t_1 = .073F$
$t_2 = .098F$
$t_3 = .105F$
$t_4 = .102F$
$t_5 = .061F$
$S_1 = 1.470F$
$S_2 = .131F$
$S_3 = .132F$
$n_D(I) = 1.5286$
$n_D(IIa) = 1.514$
$n_D(IIb) = 1.7506$
$n_D(Va) = 1.7506$
$n_D(Vb) = 1.613$
$\nu(I) = 51.6$
$\nu(IIa) = 70.2$
$\nu(IIb) = 27.8$
$\nu(Va) = 27.8$
$\nu(Vb) = 44.2$ the $n_D$ and $\nu$ values being absolute values.

2. A microscope semi-objective which is used in cooperation with a negative field flattening and aberration correcting lens having 5× magnification per se, said negative lens being interchangeably used with a set of other semi-objectives of different powers which are all parfocalized with respect to each other, said field flattening lens and semi-objective being designed to be complementary to each other in producing a total image magnification of 5× and a numerical aperture of .08 whereby the present semi-objective per se produces a magnification of substantially 1.0×, the focal length thereof being designated $F_1$ and the equivalent focal length of said field flattening lens being designated $-F(V)$, said semi-objective comprising a front positive singlet lens designated I which is spaced from a specimen plane at an axial distance designated $S_1$ and has an axial thickness designated $t_1$, a positive doublet lens designated II spaced rearwardly of lens I at an axial distance designated $S_2$, lens II being composed of a front double convex lens element designated IIa which lies in full surface contact with a rear negative meniscus lens element designated IIb, the distance between element IIb and said rearwardly located field flattening lens V being designated $S_3$, said field flattening lens comprising a front double convex lens element Va which lies in surface contact with a rear double concave lens element Vb, said lens elements IIa and IIb having axial thicknesses designated $t_2$ and $t_3$ respectively, and lens elements Va and Vb having axial thicknesses designated $t_4$ and $t_5$ respectively, the specific values, in terms of F, for the constructional parameters for one successful form of said semi-objective including the radii of the successive lens surfaces which are designated $R_1$ to $-R_8$ numbering from the front as formed on the lens elements I to Vb, the minus ($-$) sign meaning that the designated lens surface is concave toward entrant rays, and additionally the specific values for the airspaces $S_1$ to $S_3$, lens thicknesses $t_1$ to $t_3$, as well as the refractive indices $n_D$ and Abbe numbers $\nu$ of the glasses used in said lens elements, the term F representing the combined equivalent focal length of the semi-objective together with the lens V, $R_1 = \text{PLANO}$
$-R_2 = .807F$
$R_3 = .538F$
$-R_4 = .612F$
$-R_5 = 10.838F$
$R_6 = 1.663F$
$-R_7 = .841F$
$R_8 = .433F$
$t_1 = .073F$
$t_2 = .098F$
$t_3 = .105F$
$t_4 = .102F$
$t_5 = .061F$
$S_1 = 1.470F$
$S_2 = .131F$
$S_3 = .132F$
$n_D(I) = 1.5286$
$n_D(IIa) = 1.514$
$n_D(IIb) = 1.7506$
$n_D(Va) = 1.7506$
$\nu(I) = 51.6$
$\nu(IIa) = 70.2$
$\nu(IIb) = 27.8$
$\nu(Va) = 27.8$
$\nu(Vb) = 44.2$ the $n_D$ and $\nu$ values being absolute values.

(References on following page)

References Cited

UNITED STATES PATENTS 1,479,229  1/1924  Erfle _____ 350—231

FOREIGN PATENTS

Z4700,1X/42H  2/1956  Germany.
945,467  1/1964  Great Britain.

DAVID SCHONBERG, Primary Examiner
A. M. OSTRAGER, Assistant Examiner

U.S. Cl. X.R.

350—228